United States Patent
Tohara et al.

(10) Patent No.: US 8,088,029 B2
(45) Date of Patent: Jan. 3, 2012

(54) CHAIN TRANSMISSION FOR USE IN AN ENGINE

(75) Inventors: Takashi Tohara, Osaka (JP); Tatsuya Konishi, Osaka (JP); Toyonaga Saitoh, Osaka (JP)

(73) Assignee: Tsubakimoto Chain Co., Osaka (JP)

( * ) Notice: Subject to any disclaimer, the term of this patent is extended or adjusted under 35 U.S.C. 154(b) by 671 days.

(21) Appl. No.: 12/188,404

(22) Filed: Aug. 8, 2008

(65) Prior Publication Data

US 2009/0111626 A1    Apr. 30, 2009

(30) Foreign Application Priority Data

Oct. 24, 2007  (JP) .................................. 2007-275918

(51) Int. Cl.
  *F16G 13/04*  (2006.01)
(52) U.S. Cl. ........ 474/212; 474/155; 474/111; 474/140; 474/206; 474/202; 474/213
(58) Field of Classification Search .................. 474/155, 474/157, 156, 206, 111, 140, 212, 202, 213
  See application file for complete search history.

(56) References Cited

U.S. PATENT DOCUMENTS

| | | | | |
|---|---|---|---|---|
| 2,798,381 A | * | 7/1957 | Siverson | 474/222 |
| 4,328,665 A | | 5/1982 | Taubert et al. | |
| 6,220,981 B1 | * | 4/2001 | Yoshida | 474/111 |
| 2006/0079363 A1 | * | 4/2006 | Miyazawa | 474/206 |

FOREIGN PATENT DOCUMENTS

| | | |
|---|---|---|
| EP | 1843061 A1 | 10/2007 |
| GB | 2018388 A | 10/1979 |
| GB | 2334564 A | 8/1999 |
| JP | 2006105325 A | 4/2006 |

* cited by examiner

*Primary Examiner* — Emmanuel M Marcelo
(74) *Attorney, Agent, or Firm* — Howson & Howson LLP (57) ABSTRACT

In a chain transmission, the guide-contacting portions of inner and outer plates of a chain each comprise a pair of front and rear flat surfaces, an intermediate concave oil-retaining surface and convex connecting surfaces. The lengths of the flat surfaces are such that adjacent flat surfaces of overlapping inner and outer plates overlap even when the plates in contact with the portion of a convex guide surface having the smallest radius of curvature.

4 Claims, 8 Drawing Sheets

CHAIN TRANSMISSION FOR USE IN AN ENGINE

CROSS REFERENCE TO RELATED APPLICATION

This application claims priority on the basis of Japanese patent application 2007-275918, filed Oct. 24, 2007. The disclosure of Japanese application 2007-275918 is hereby incorporated by reference.

FIELD OF THE INVENTION

The invention relates to a transmission chain for use in an engine such as an automobile engine, and has particularly utility as a timing chain connected between an engine crankshaft and one or more camshafts, as a balancer chain, or as a chain for driving an auxiliary engine component such as an oil pump.

BACKGROUND OF THE INVENTION

An automobile engine typically includes a timing chain for transmitting power from a crankshaft sprocket to one or more camshaft sprockets. A typical conventional timing chain is a roller chain having inner and outer link plates 510 and 550 respectively, of the type illustrated in FIG. 8. The peripheral edges of these plates that come into sliding contact with a chain guide have concave, arc-shaped surfaces 511 or 551 for retaining lubricating oil in order to reduce friction generated as the chain slides on an between an arc-shaped chain guide G1 or a linear chain guide G2. Such a chain is described in greater detail in United States Patent Publication 2006-0079363, published Apr. 13, 2006, the disclosure of which is incorporated by reference.

Figure 8:
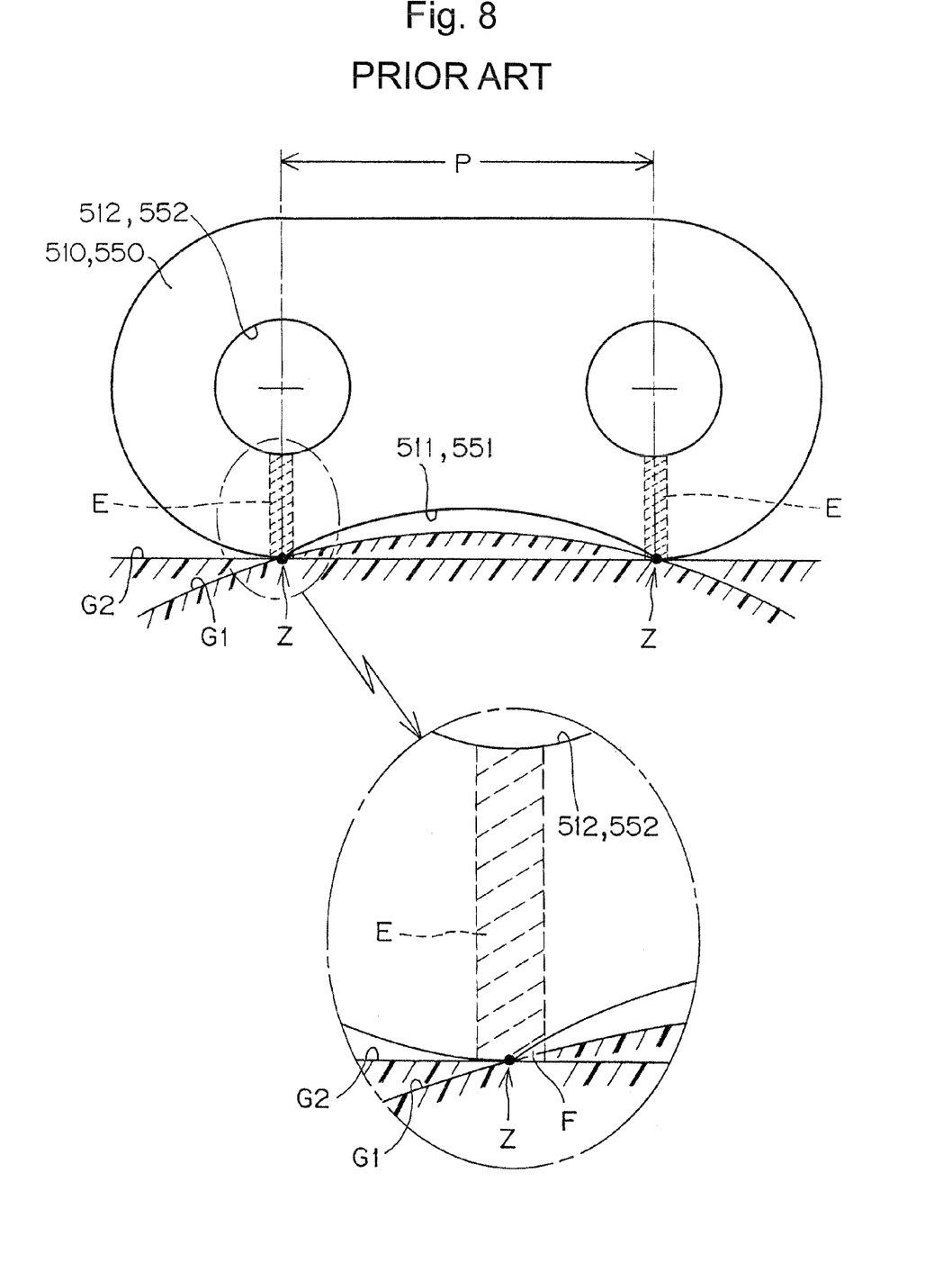
FIG. 8 is a side elevational view showing a link plate a convention transmission chain in engagement with flat and bulged guide surfaces, including an enlarged auxiliary view.

In the conventional roller chain link plate, the distance from one end of each arc-shaped surface 511 or 551 to the other end is equal to or greater than the chain pitch P, which is the distance between the centers of successive connecting pins in the chain, which are press-fit into pin holes in the outer link plates of the chain.

As shown in FIG. 8, tensile stress is concentrated, and fatigue fracture is liable to occur, in plate regions E, which are located along imaginary lines in the plate which extend, through the centers of bushing holes 512 in an inner link plate 510 or through the centers of pin holes 552 in an outer link plate 550, in directions perpendicular to the direction of elongation of the chain. Since the ends of the arc-shaped surfaces are located either within or beyond the region E, the end of region E has a cut out shape at location F, as seen in the enlarged auxiliary view in FIG. 8. Stress due to sliding contact with an arc-shaped chain guide G1, or a linear chain guide G2, acting on this plate region E, can cause chain breakage. Thus, there is a need for a way to improve the strength of the plate region E.

Furthermore, as shown in FIG. 8, the contact regions Z, over which link plates come into contact with the linear chain guide G2, are very small. Because the contact regions are small, retention of lubricating oil can be insufficient, and resistance to sliding is generated in these contact regions, resulting in impaired durability of the inner and outer link plates.

The invention addresses the above-described problems by providing a transmission chain for use in an engine, in which the link plate strength is improved in the regions where tensile force is concentrated and fatigue failure is liable to occur, and in which lubricating oil is more reliably retained between the link plates and the chain guides on which the chain slides, so that improved durability of the chain is achieved.

SUMMARY OF THE INVENTION

The chain transmission in accordance with the invention comprises an endless, elongated, transmission chain arranged to travel in a recirculating path and composed of overlapping, articulably connected, inner and outer link plates, and a chain guide adjacent the chain path. The chain guide has a convex surface positioned for sliding contact with the inner and outer link plates of the chain. Each of the inner and outer plates has a chain guide-engaging edge which comes into sliding contact with the convex surface of the chain guide. This chain guide-engaging edge comprises a pair of front and rear flat surfaces, spaced from each other along the direction of elongation of the chain. A concave surface is situated between the front and rear flat surfaces for retaining lubricating oil in a clearance between the concave surface and the convex surface of the chain guide, and the lengths of the flat surfaces in the direction of elongation of the chain are sufficient that each flat surface of each outer plate overlaps a flat surface of an adjacent overlapping inner plate even when said outer plate and its adjacent overlapping inner plates are in sliding contact with the portion of the convex surface of the chain guide having the smallest radius of curvature.

Preferably, the length L of each flat surface in the direction of elongation of the chain plate is given by $L \geq (H/2) \times \tan(P/(2(R+H/2)))$, where H is the plate height, P is the chain pitch, and R is the minimum radius of curvature of chain guide.

Reduction of strength in the part of the plate where tensile force in the chain is concentrated and fatigue failure is liable to occur, can be avoided, and capillary flow of lubricating oil into an oil-retaining clearance between the plate and the guide surface takes place so that a stable oil film is formed, and friction is reduced. In addition outward leakage of the lubricating oil from the retaining clearances is suppressed, so that smooth sliding contact between the chain and the chain guide is maintained.

Furthermore, since the lengths of the flat surfaces are such that adjacent flat surfaces of overlapping inner and outer plates overlap each other even if the overlapping inner and outer plates are in contact with a part of the chain guide having the smallest radius of curvature, adjacent oil-retaining clearances do not overlap, and therefore lubricating is more reliably retained in the lubricating oil retaining clearances.

In a preferred embodiment, the edge of each of the plates opposite from its chain guide-engaging edge has substantially the same shape as its chain guide-engaging edge. With this structure, the shapes of each of the inner and outer plate can be symmetrical about a chain pitch line through the centers of its pin holes or bushing holes. This structure makes it possible for the chain to be guided on both sides and reduces the overall weight of the chain without materially impairing its tensile strength or durability. Furthermore, when the plates are symmetrical, assembly of the chain can be carried out without considering the orientation of the plates.

DETAILED DESCRIPTION OF THE PREFERRED EMBODIMENTS

In accordance with the invention, in a transmission chain comprising overlapping link plates that come into sliding contact with a convex guide, the edges of the plates are formed with two, longitudinally spaced, surfaces which are flat in profile, with an oil-retaining clearance between them. A flat surface each link plate overlaps a flat surface of an adjacent overlapping link plate when the chain is stretched in a straight line, and also when the chain is in sliding engagement with the convex guide, even when the two link plates are engaged with the portion of the guide having the smallest radius of curvature and are therefore bent relative to each other at a maximum angle. Adjacent oil-retaining clearances do not overlap, and consequently more lubricating oil is reliably retained in the lubricating oil retaining clearances.

The invention can be embodied in any of various, kinds of chain transmissions, including transmissions in which the guide-contacting parts of the chain are on the outside of the loop formed by the chain, on the inside of the loop, or on both the inside and outside of the loop. If the plates are shaped so that their guide-contacting portions are formed both on the inside and on the outside of the loop, the overall weight of the chain can be reduced. Furthermore, the plates can have a symmetrical shape on both sides of the chain's pitch line, and the chain can be assembled without considering the orientation of the plates.

The invention can be embodied in a chain transmission utilizing any of various kinds of chain including a rollerless bushing chain, a roller chain, and a silent chain. A bushing chain or roller chain is usually preferred where smooth engagement with a sprocket and avoidance of wear are the most important considerations. On the other hand, a silent chain is usually preferred where reduction of engagement noise is desired.

In the chain transmissions according to the invention, it is not necessary for all the plates of the chain to have the spaced flat portions with a concave oil-retaining portion between them. However, it is preferred that all the plates of the chain that come into sliding contact with a chain guide have this configuration, whether the chain is a bushing chain, a roller chain, a silent chain or another type of transmission chain.

Figure 1:
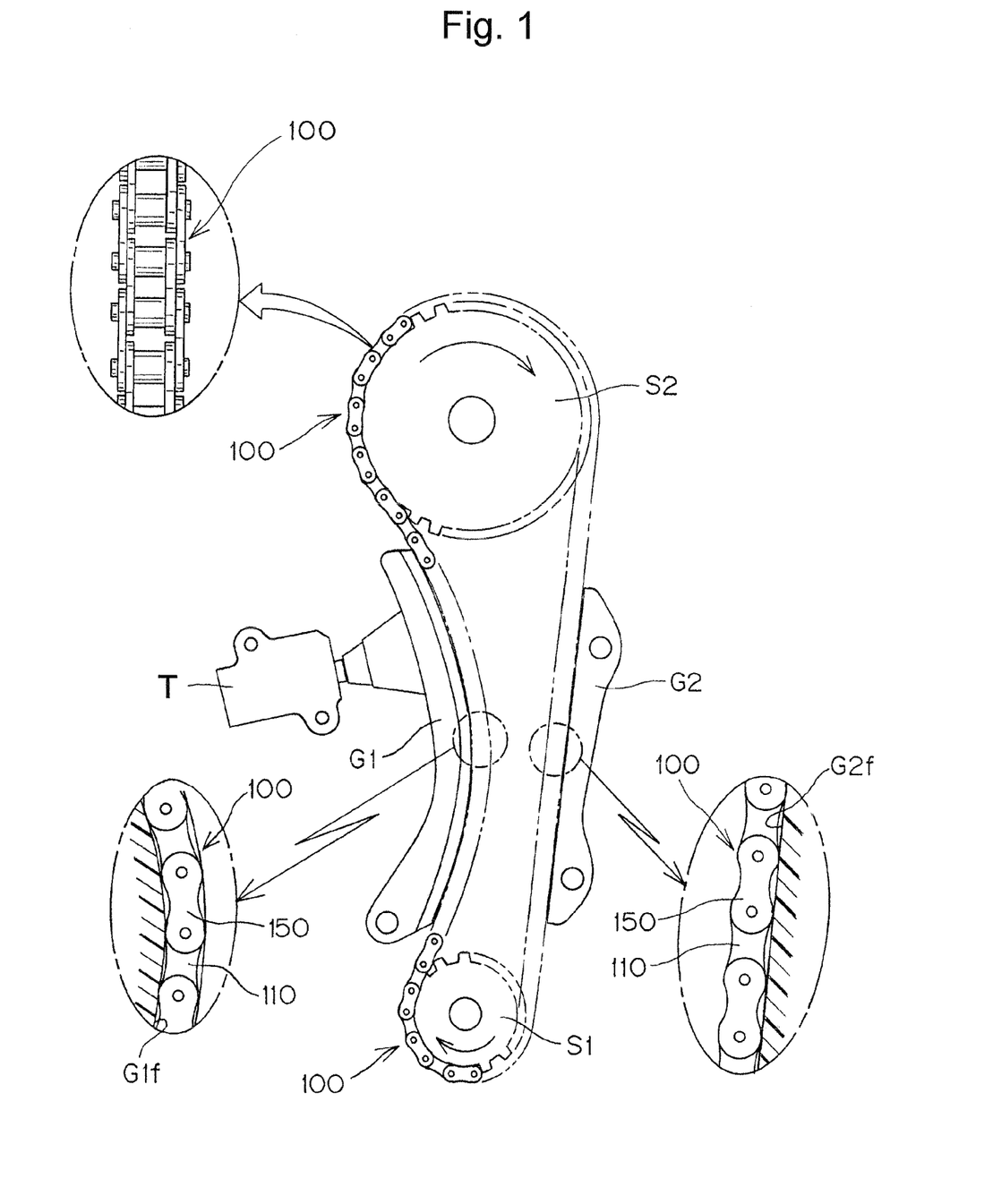
FIG. 1 is an elevational view of an engine timing transmission incorporating a chain in accordance with the invention, the figure including enlarged auxiliary views.

The transmission chain 100 shown in FIG. 1 is timing chain used in a timing drive of an automobile engine. The chain is in the form of an endless loop and is driven by a crankshaft sprocket S1 and drives a camshaft sprocket S2. A chain guide G1 is pivotally supported on the engine block and urged by a tensioner T against the part of the chain 100 traveling from the driving sprocket S1 toward the driven sprocket S2 so that it applies appropriate tension to the chain. As shown in one of the enlarged auxiliary views in FIG. 1, the chain guide G1 has a convex guide surface G1$f$, which is in sliding contact with the chain on the outside of the loop.

A fixed chain guide G2 is provided adjacent the side of the chain traveling from the driven sprocket S2 toward the driving sprocket S1. Chain guide G2 has a flat guide surface G2$f$, which is also in sliding contact with the chain on the outside of the loop.

Figure 2:
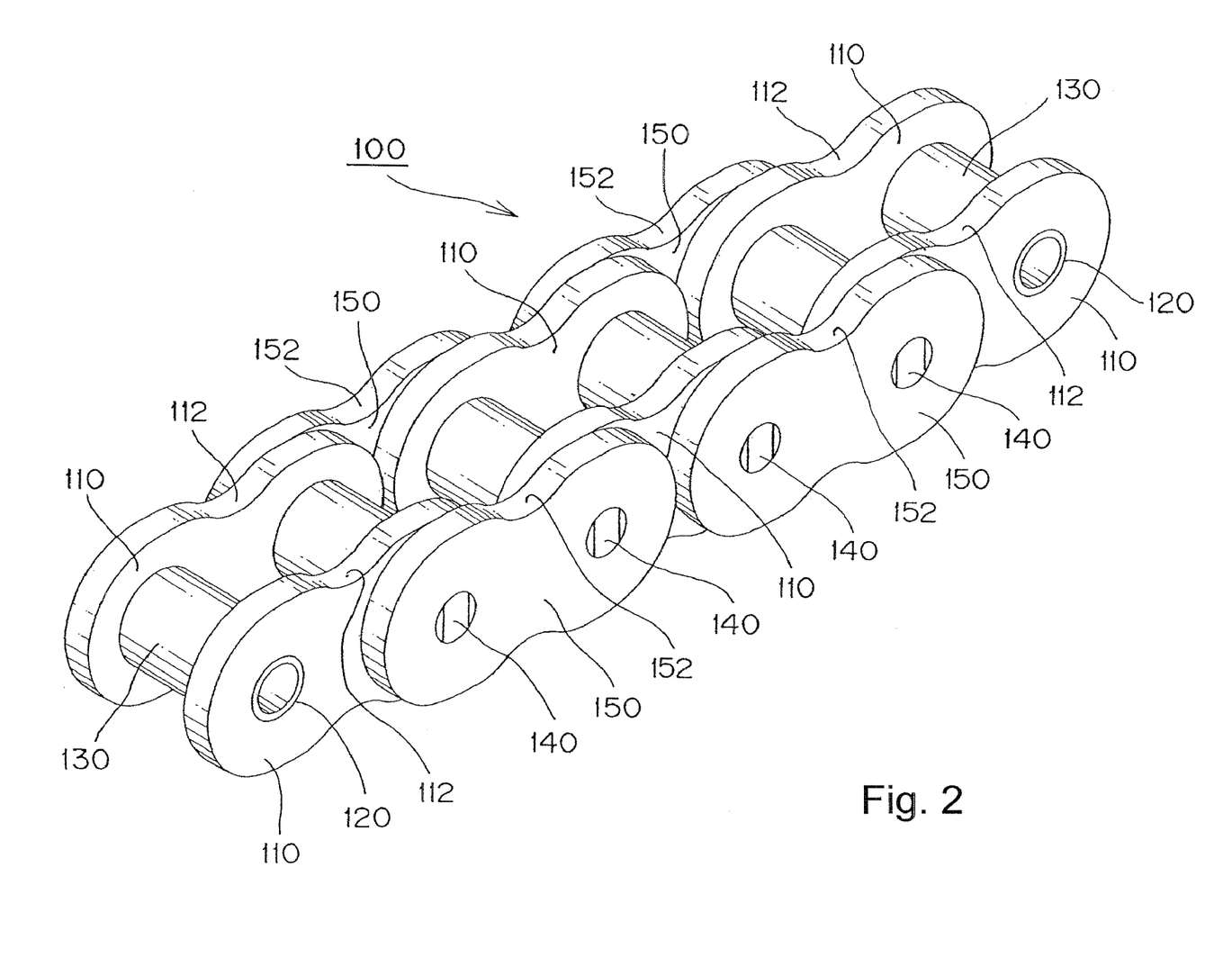
FIG. 2 is a perspective view of a part of a transmission chain in accordance with the invention.

As shown in FIG. 2, the transmission chain 100 comprises pairs of laterally spaced inner plates 110 having front and rear bushings 120 press-fit into the bushing holes in the plates, and front and rear rollers 130 rotatable on the bushings 120. Front and rear connecting pins 140 extend through the bushings 120 and are press-fit into pin holes 151 in outer plates 150, which are also disposed in pairs and which overlap the inner plates, forming an articulating roller chain.

Figure 3:
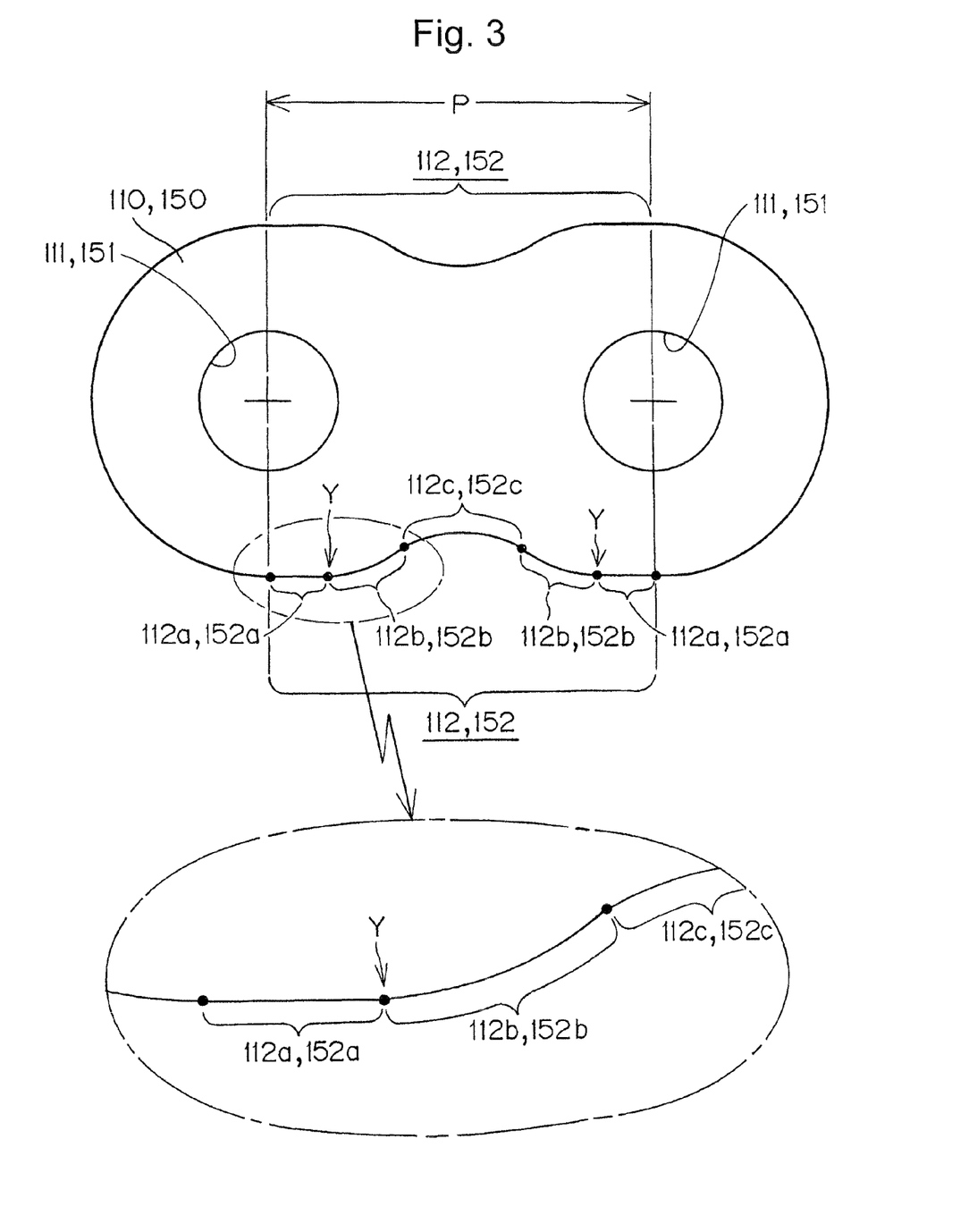
FIG. 3 is a side elevational view of a link plate in the chain including an enlarged auxiliary view showing details of the edge configuration of the link plate.
Figure 4:
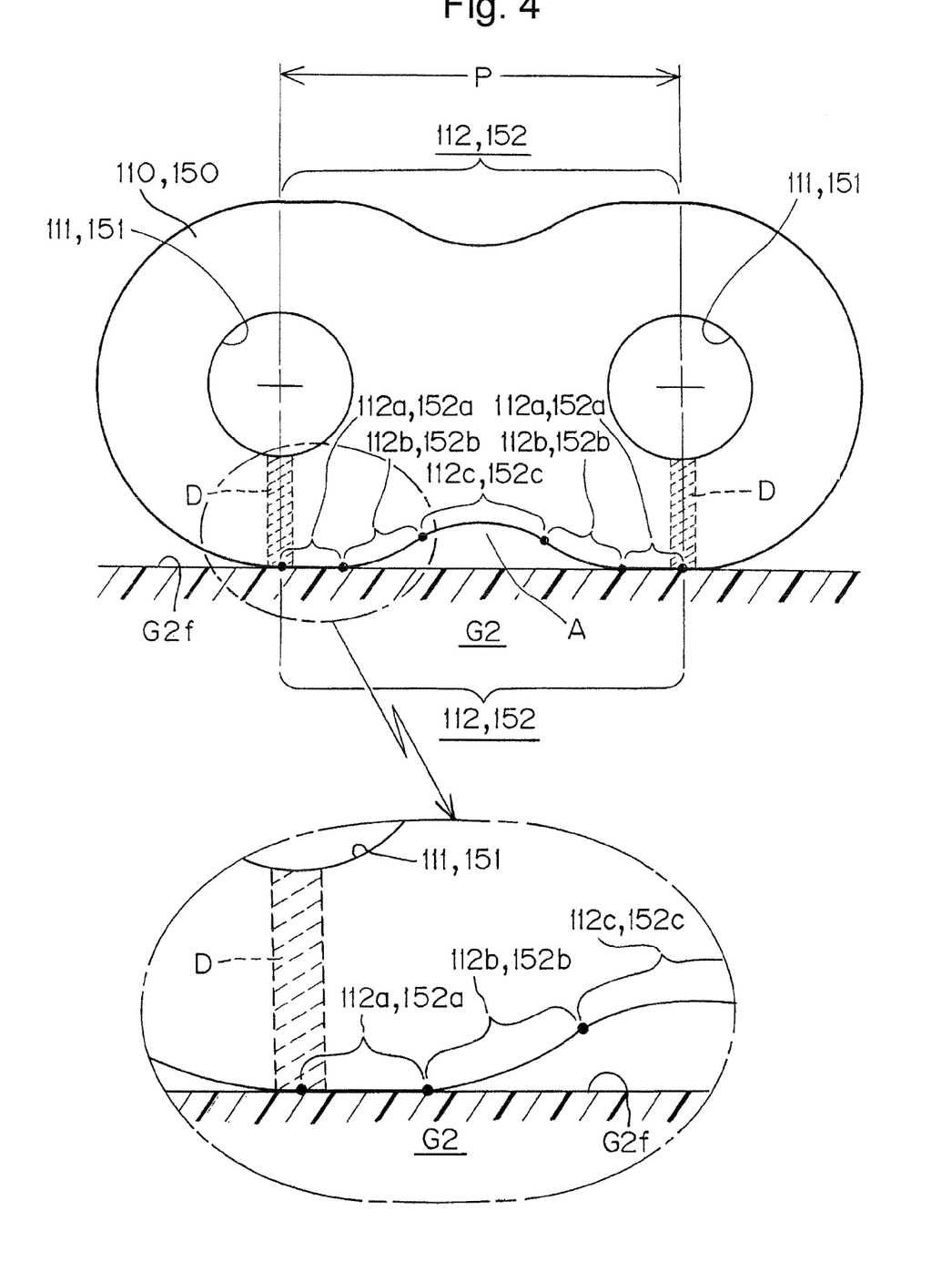
FIG. 4 is a side elevational view showing the link plate in sliding contact with a flat guide surface, including an enlarged auxiliary view.

As shown in FIGS. 3 and 4, the inner plate 110 and the outer plate 150 respectively include sliding contact portions 112 and 152, which come into sliding contact with chain guides G1 and G2.

Each of the sliding contact portions 112 or 152 respectively comprises a pair of surfaces 112$a$ and 152$a$, which are flat in profile and disposed respectively in front and rear portions of each plate. The flat surfaces of each plate are spaced from each other in the longitudinal direction of the plate, which is also the direction of elongation of the chain. A convex curved surface 112$b$ or 152$b$ is continuous with each of the flat surfaces, and the convex curved surfaces are both continuous with, and connected to each other by, a concave lubricating oil-retaining surface 112$c$ or 152$c$. The flat surfaces 112$a$ and 152$a$ are provided at the front and rear of the inner plates 110 and outer plates 150. As shown in FIG. 4, as a plate slides on the fixed chain guide G2, the flat surface 112$a$ and 152$a$ come into sliding contact with flat guide surface G2$f$.

Figure 5:
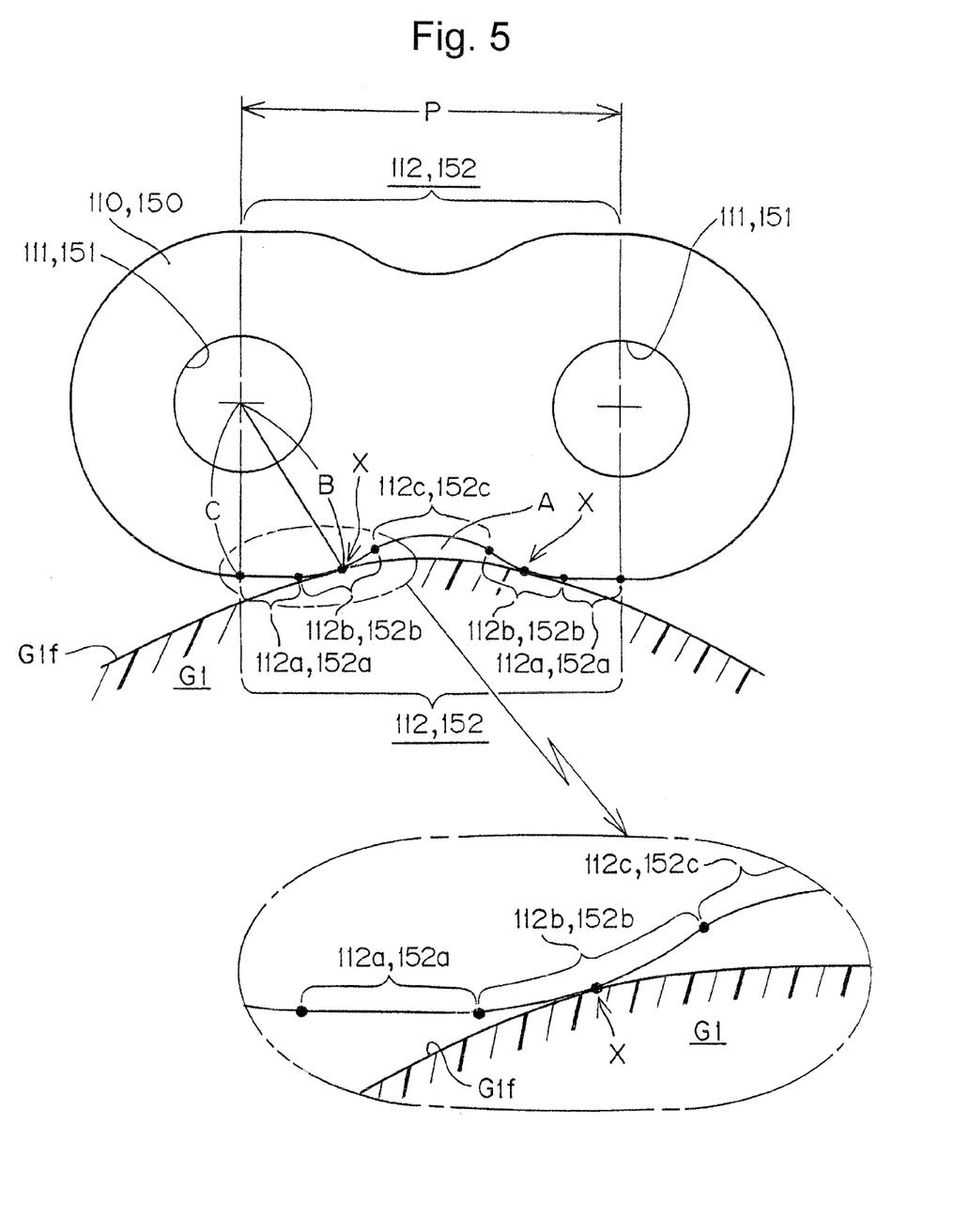
FIG. 5 is a side elevational view showing the link plate in sliding contact with a bulged guide surface, including an enlarged auxiliary view.

As shown in FIG. 5, where the chain is in sliding contact with the convex guide surface G1$f$ of chain guide G1, the convex curved surfaces 112$b$ and 152$b$ come into sliding contact with guide surface G1$f$ at contact locations X.

The radii of curvature of convex surfaces 112$b$ and 152$b$ increase gradually from the flat surfaces 112$a$ and 152$a$ toward the oil-retaining concave surfaces 112$c$ and 152$c$. Thus, excessive widening of the oil-retaining clearance A, between the chain guides and the concave oil-retaining surfaces 112$c$ and 152$c$ is avoided, and capillary action can more effectively induce flow of engine lubricating oil in the vicinity of the guide into the oil-retaining clearance A.

As shown in FIG. 3, the distance between boundaries Y, where the curved surfaces 112$b$ and 152$b$ of a plate meet the flat surfaces 112$a$ and 152$a$ of the plate, is shorter than the chain pitch P.

The convex curved surfaces 112$b$ and 152$b$ prevent sinking of the chain with respect to the convex surface G1$f$ of guide G1. Without these curved surfaces 112$b$ and 152$b$, the flat surfaces 112$a$ and 152$a$ would come into sliding contact with the guide surface G1$f$ at the locations of boundaries Y, with the result that some sinking of the chain will occur on the convex guide surface.

The lengths L of the flat surfaces 112$a$ and 152$a$ are such that $$L \geq (H/2) \times \tan(P/(2(R+H/2)))$$

where:
H is the plate height
P is the chain pitch

R is the minimum radius of curvature of chain guide

Figure 6:
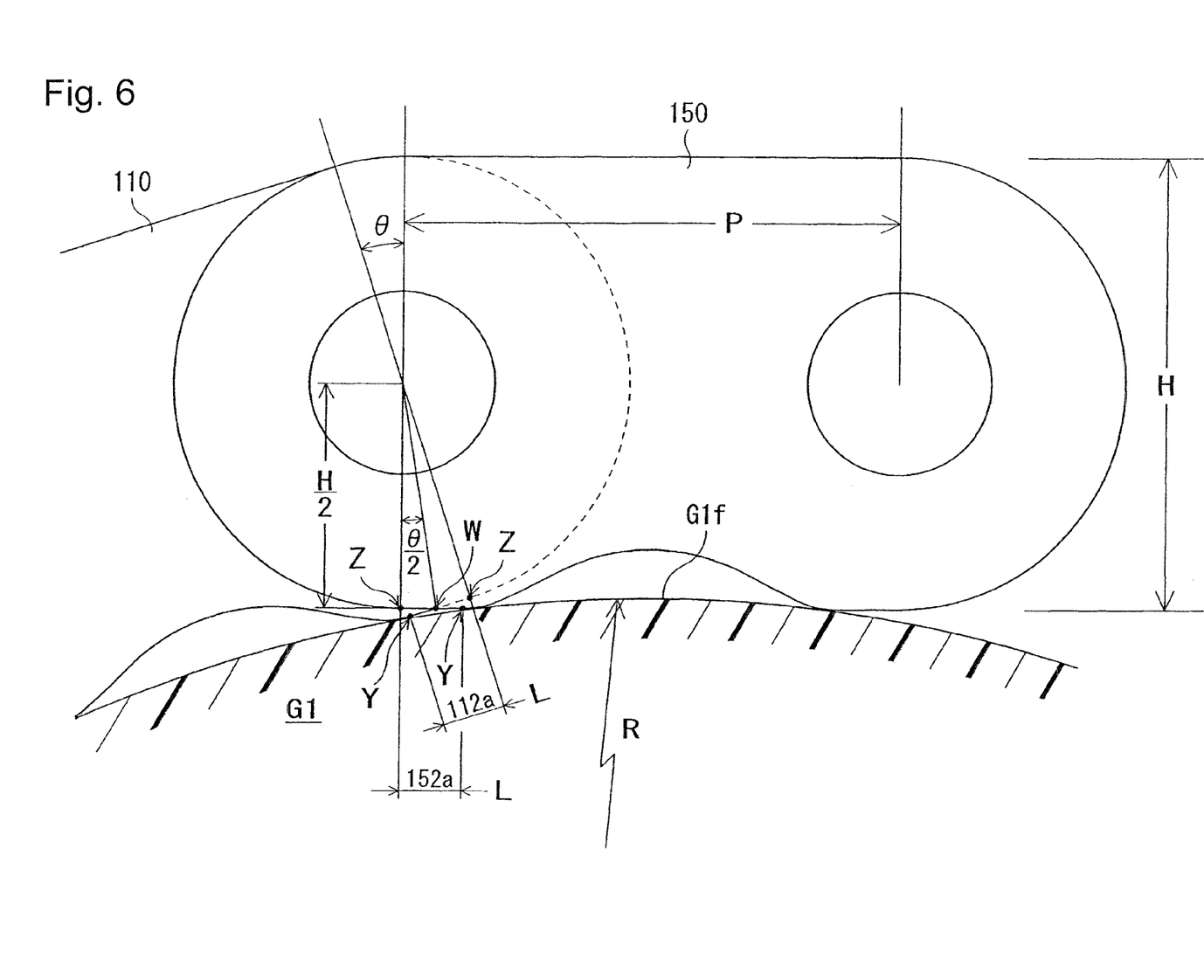
FIG. 6 is a side elevational view showing the relationship between the length L of the flat surface of a link plate and a chain guide.

The derivation of the above value of L is as follows, referring to FIG. 6. The bending angles θ of the plates 110 and 150 are obtained by dividing the angle 2π (in radians) of the entire circumference by 2π(R+H/2)/P, which is the number of pairs of side-by-side link plates in a chain, obtained when a chain having pitch P is wound onto a cylinder having a radius of R+H/2). θ=2π÷(2π(R+H/2)/P). Thus, θ=P/(R+H/2), in radians.

The lengths L of the flat surfaces 112a and 152a can overlap at a maximum bend angle θ if they correspond to an angle equal to at least one half the bend angle, i.e., θ/2. These lengths must be at least the distance between points Z and points W in FIG. 6. The distance from point Z to point W is (H/2)×tan(θ/2). Since θ/2=P/(2(R+H/2)), the distance from point Z to point W is (H/2)×tan(P/(2(R+H/2))).

So long as L is equal to or greater than (H/2)×tan(P/(2(R+H/2))), the adjacent flat surfaces 112a and 152a overlap with each other, with a point of intersection at W, located intermediate the respective starting points Z and the terminal points Y.

The plates in FIGS. 3-7 have a pair of holes labeled 111, 151, holes 111 being holes in the inner plates 110 into which bushings are press-fit, and holes 151 being holes in the outer plates 150 into which connecting pins are press-fit. These holes are shown as a single hole for convenience. However, it should be understood that the diameters of the bushing holes 111 will ordinarily be greater than the diameters of the pin holes 151. In all other respects, the inner and outer plates preferably have the same shape.

As shown in FIG. 5, the distance B from the center of the bushing hole 111 or the pin hole 151 to the contact position X, where guide surface G1f contacts a curved surface 112b or 152b, is greater than the minimum distance C from the center of the bushing hole or pin hole to the flat surface 112a or 152a. Thus, even when stress due to the contact between the plate and the guide surface G1f acts on a portion of the plate near the contact position X, sufficient chain strength can be exhibited.

The oil-retaining concave surfaces 112c and 152c respectively span a pair of front and rear convex curved surfaces 112b and 152b, as shown in FIGS. 3 to 5, forming a lubricating oil retaining clearance A with the chain guides G1 and G2. The maximum height of clearance A, that is the maximum distance between the curves 112c and 152c and the chain guides G1 and G2, should be 1 mm or less so that capillary action can effectively induces flow of lubricating oil into the oil-retaining clearance A.

As shown in FIGS. 3, 4, 5 and 7, the inner plate 110 and the outer plate 150 have contact portions 112 and 152 on both sides, that is on the side facing the sprockets as well as on the sides facing the outside of the loop formed by the chain. A plate can be made symmetrical about a pitch line extending from the center of one of its pin or bushing holes to the center of its other hole. If the plates are made symmetrical, assembly of the chain is facilitated since it is unnecessary to take the orientation of the plates into account.

In the chain, portions 112 and 152 of the inner plate 110 and the outer plate 150 respectively comprise a pair of longitudinally spaced front and rear flat surfaces 112a and 152a, a pair of front and rear convex curved surfaces 112b and 152b, continuous with the flat surfaces 112a and 152a and positioned toward the center of the plate, and oil-retaining concave surfaces 112c and 152c, spanning the front and rear curved surfaces 112b and 152b. Thus, capillary action, which induces flow of lubricating oil into the oil-retaining clearance A, is generated so that a stable oil film is formed between the plate and the guide, and friction between the guide and the chain is reduced.

Since the flat surfaces 112a and 152a come into sliding contact with the flat surface G2f of the chain guide G2 lubricating oil is reliably retained in clearance A and outward leakage of the lubricating oil is suppressed so that sliding contact with the chain guide G2 can be made smooth and the efficiency of the automobile engine is improved.

Since the flat surfaces 112a and 152a come into sliding contact with the flat guide surface G2f and the pair of front and rear plate convex curved surfaces 112b and 152b come into sliding contact with the convex guide surface G1f, stress from the chain guides G1 and G2 is not concentrated at specified positions on the inner and outer plates of the chain, and the durability of the chain is significantly improved.

Further, since the lengths L of the flat surfaces 112a and 152a in are such that the adjacent flat surfaces of overlapping inner and outer link plates overlap even if the plates are in contact with the convex guide surface G1f at a location where a radius of curvature of said guide is the smallest, the adjacent oil-retaining concave surfaces 112c and 152c do not overlap, and the volume of the oil retaining clearance A can be always maintained at a maximum so that the lubricating oil is reliably retained.

Since the longitudinal distance between the boundaries between the flat surfaces 112a and 152a and the convex curved surfaces 112b and 152b is shorter than a chain pitch P, the curved surfaces 112b and 152b can be formed without cutting out any portion of regions D (FIG. 4) in the vicinity of imaginary lines extending through the centers of the pinholes or bushing holes perpendicular to the chain's pitch line. It is in regions D where the chain's tensile force is concentrated, and fatigue fracture is most likely to occur. However, since the curved surfaces are formed without cutting region, reduction in the strength of the plates can be avoided. Thus, even if stress due to sliding contact with the flat guide surface G2f acts on region D, the chain can exhibit sufficient strength.

Figure 7:
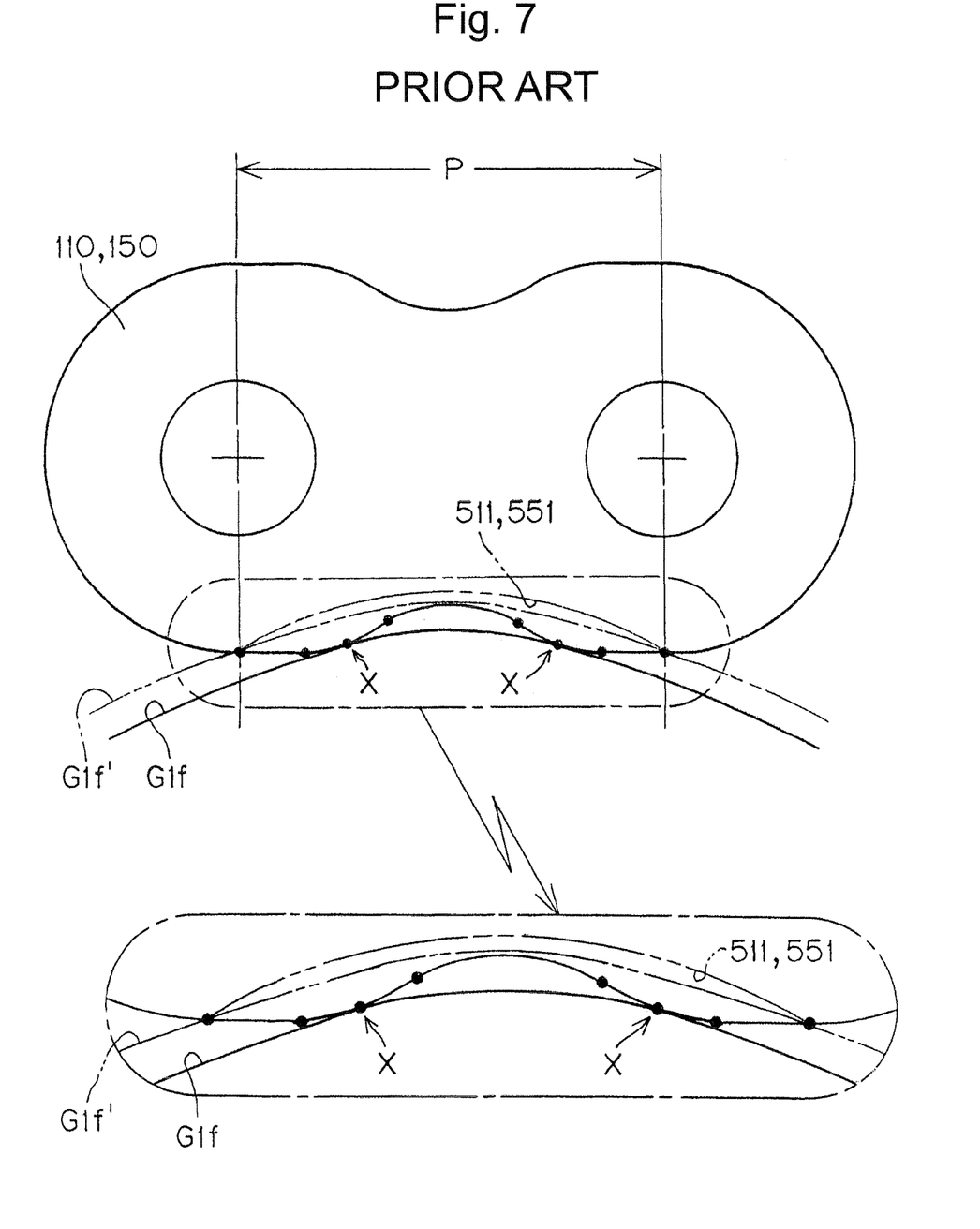
FIG. 7 is an elevational view illustrating the sinking of a link plate with respect to a bulged surface of a chain guide, including an enlarged auxiliary view.

In FIG. 7, G1f denotes a convex guide surface of a chain guide in a case where a chain guide come into sliding contact with a conventional transmission chain in which the distance between the two locations at which the plate contacts the guide is equal to, or greater than, the chain pitch. However, with the chain according to the invention, since the distance between contact positions X is shorter the chain pitch, sinking of the chain with respect to the convex bent guide surface G1f is reduced, chain slack due to sinking of the chain is avoided, and the chain path can be stabilized. The extent of sinking of the conventional chain compared to the chain according to the invention corresponds to the distance between surfaces G1f and G1f' in FIG. 7.

In summary, the invention exhibits significant advantages over the conventional chain transmission. In particular, the flat surfaces of the link plates are positioned to avoid cutting away portions of the regions of the plates where stress tends to concentrate, and overlapping of the adjacent flat portions of adjacent overlapping plates, even when the chain is bent to a maximum degree when in contact with a portion of a convex chain guide having the smallest radius of curvature, ensures more reliable retention of oil in the oil-retaining clearances between the plates and the guide.

Furthermore, since the radii of curvature of the convex curved surfaces gradually increase from the flat surfaces toward the concave oil-retaining surface, excessive widening of the oil-retaining clearance A is avoided, capillary action, is enhanced, smoother sliding of the plate on the chain guides is realized, and engine efficiency is improved.

Finally, when the plates have similarly formed edges both on the inside and on the outside of the loop formed by the chain, the chain can come into contact with guides both on the inside and on the outside of the loop, and a weight reduction can be realized. Furthermore, if the plates are made symmetrical, assembly of the chain is simplified.

We claim:

1. A chain transmission for use in an engine, comprising an endless, elongated, transmission chain arranged to travel in a planar recirculating path and composed of overlapping, inner and outer link plates, each of said plates having two round holes and the inner and outer link plates being articulably connected by pins extending through said holes, and a chain guide adjacent said path, the chain guide having a surface positioned for sliding contact with the inner and outer link plates of the chain, said surface having a convex profile when viewed in a direction perpendicular to the plane of said planar recirculating path, wherein each of said inner and outer plates has a chain guide-engaging edge which comes into sliding contact with the convex surface of the chain guide, said chain guide-engaging edge comprising a pair of front and rear surfaces that have a flat profile when viewed in said direction perpendicular to the plane of said planar recirculating path, the front and rear flat surfaces being spaced from each other along the direction of elongation of the chain, and an intermediate surface having a concave profile when viewed in said direction perpendicular to the plane of said planar recirculating path, said intermediate surface being between said front and rear surfaces having flat profiles, the intermediate surface and said surface of the chain guide forming a clearance for retaining lubricating oil, wherein the lengths of said surfaces having flat profiles, in the direction of elongation of the chain, are sufficient that each said surface having a flat profile on each outer plate overlaps a surface having a flat profile on an adjacent overlapping inner plate even when said outer plate and its adjacent overlapping inner plates are in sliding contact with the portion of said surface of the chain guide having the smallest radius of curvature, wherein, in each of said plates, the surfaces thereof having flat profiles are connected to the intermediate surface thereof by connecting surfaces having convex profiles when viewed in said direction perpendicular to the plane of said planar recirculating path, wherein the distance between the boundaries at which the connecting surfaces of each plate meet the surfaces having flat profiles on the same plate is shorter than the chain pitch, and wherein the distance from the center of each of said holes in a plate to an adjacent point of contact between a connecting surface of the same plate and said surface of the chain guide is greater than the minimum distance from said center to the nearest adjacent one of said surfaces having a flat profile on the same plate.

2. A chain transmission according to claim 1, in which the edge of each of said plates opposite from its chain guide-engaging edge has substantially the same shape as its chain guide-engaging edge.

3. A chain transmission according to claim 1, characterized in that the length L of each said surface having a flat profile, in the direction of elongation of the chain, is given by $L \geq (H/2) \times \tan(P/(2(R+H/2)))$, where H is the plate height, P is the chain pitch, and R is the minimum radius of curvature of said convex profile of said surface of the chain guide.

4. A chain transmission according to claim 3, in which the edge of each of said plates opposite from its chain guide-engaging edge has substantially the same shape as its chain guide-engaging edge.

* * * * *